Patented Oct. 5, 1937

2,094,845

UNITED STATES PATENT OFFICE 2,094,845

DIS- AND TRIS-AZO DYESTUFFS AND PROCESS OF MAKING SAME

Hans Krzikalla and Ludwig Neumann, Ludwigshafen-on-Rhine, Germany, assignors to General Aniline Works, Inc., New York, N. Y., a corporation of Delaware No Drawing. Application March 24, 1936, Serial No. 70,610. In Germany April 9, 1935

16 Claims. (Cl. 260—77)

The present invention relates to dis- and trisazo dyestuffs and a process of making same.

We have found that very valuable azo dyestuffs are obtained by coupling the tetrazo compound of 4,4'-diaminodiphenylamine or its sulfonic acids in an alkaline medium with one molecular proportion of a 1-hydroxy-8-aminonaphthalene sulfonic acid capable of being coupled and one molecular proportion of a hydroxy compound of the benzene series which is capable of being coupled at least once.

As 1-hydroxy-8-aminonaphthalene sulfonic acids may be mentioned both monosulfonic and polysulfonic acids, as for example 1-hydroxy-8-aminonaphthalene-3,6-, 4,6-, or 2,4-disulfonic acid, 1-hydroxy-8-aminonaphthalene-4- or -5-sulfonic acid. As hydroxy compounds of the benzene series capable of being coupled at least once may be mentioned for example hydroxybenzene, hydroxymethyl- and hydroxydimethylbenzenes, 1,3-dihydroxybenzene and its derivatives, 1,2,3-tri-hydroxybenzene, ortho-hydroxybenzoic acid, hydroxymethyl-benzene carboxylic acids, meta-hydroxydiphenylamine and also derivatives thereof which are still capable of being coupled in the phenol ring, such as 2',4'-dinitro-3-hydroxydiphenylamine, 5'-hydroxy-2',4'-dinitro-3-hydroxydiphenylamine or 2',4',6'-trinitro-3-hydroxydiphenylamine. If the disazo dyestuffs obtained are capable of being coupled they may be converted into trisazo dyestuffs by treatment with diazotized aromatic amines.

The dyestuffs obtainable in the said manner are, generally speaking, deep blue to blue-black; they are especially suitable for dyeing leather. They are distinguished by a good stability to acids and alkalies and good solubility and they penetrate so deeply into the leather that they are also suitable for dyeing velour leather. The dyestuffs also have an affinity for cotton and viscose artificial silk.

The following examples will further illustrate how our said invention may be carried out in practice, but the invention is not restricted to these examples. The parts are by weight.

Example 1

19.9 parts of 4,4'-diaminodiphenylamine are tetrazotized and coupled in alkaline solution with 31.9 parts of 1-hydroxy-8-aminonaphthalene-3,6-disulfonic acid. The diazo compound of the monoazo dyestuff thus obtained is then coupled with a solution of 11.8 parts of 1-hydroxy-4-methylbenzene in dilute caustic soda solution. After salting out, a dyestuff is obtained which yields dark blue to black shades of good fastness to polishing on chrome calf velour leather. The dyestuff has a good stability to acids and alkalies and may also be used for dyeing cotton.

Dyestuffs having similar good properties are obtained by employing 1-hydroxy-2-methylbenzene or 1,3-dihydroxybenzene instead of 1-hydroxy-4-methylbenzene. If 4,4'-diaminodiphenylamine-2-sulfonic acid be employed instead of 4,4'-diaminodiphenylamine, dyestuffs are obtained which, generally speaking, yield a somewhat more red dyeing and have a somewhat slighter dyeing power for cotton.

Example 2

19.9 parts of 4,4'-diaminodiphenylamine are tetrazotized and coupled with 31.9 parts of 1-hydroxy-8-aminonaphthalene-2,4-disulfonic acid in alkaline solution. To the resulting diazo compound of the monoazo dyestuff there is then added a weakly alkaline solution of 11.9 parts of 1,3-dihydroxybenzene and the mixture is stirred until the formation of the disazo dyestuff is completed. The dyestuff dyes leather and cotton beautiful blue shades. The dyestuff obtained by means of 1-hydroxy-3-methoxybenzene is similar.

Example 3

27.9 parts of 4,4'-diaminodiphenylamine-2-sulfonic acid are tetrazotized and the tetrazo compound is coupled in alkaline solution with 31.9 parts of 1-hydroxy-8-aminonaphthalene-3,6-disulfonic acid. There are then added to the slightly alkaline solution 12 parts of 1,3-dihydroxybenzene, a dyestuff thus being obtained which dyes leather black shades.

Instead of 1,3-dihydroxybenzene, a trihydroxybenzene, as for example 1,2,3-trihydroxybenzene or 1,3,5-trihydroxybenzene, may be employed. Equally good dyestuffs are thus obtained. In order to displace the shades of the dyestuffs somewhat more towards green, they may be aftertreated for example with the diazo compound of 13.8 parts of 1-amino-4-nitrobenzene so that a trisazo dyestuff is obtained which dyes markedly greener shades.

Example 4

19.9 parts of 4,4'-diaminodiphenylamine are tetrazotized and coupled in a solution rendered alkaline with sodium carbonate with 31.9 parts of 1-hydroxy-8-aminonaphthalene-3,6-disulfonic acid. When the 1-hydroxy-8-aminonaphthalene-3,6-disulfonic acid has been used up, 18.5 parts of meta-hydroxydiphenylamine dissolved in dilute caustic soda solution are introduced, the whole then being stirred for several hours. When coupling is completed, the product is salted out and filtered off by suction. A blue dyestuff is obtained which yields deep dark blue to black shades of good fastness to polishing on chrome calf velour leather. Dyestuffs having similar properties are obtained for example by employing 1-hydroxy-8-aminonaphthalene-2,4- or -4,6-disulfonic acid instead of 1-hydroxy-8-aminonaphthalene-3,6-disulfonic acid. If the first coupling component is a 1-hydroxy-8-aminonaphthalene monosulfonic acid, the presence of at least one further sulfonic group in the second coupling component or in the tetrazo compound is desirable in order to ensure a satisfactory solubility of the dyestuff.

*Example 5*

27.2 parts of 4,4'-diaminodiphenylamine-2-sulfonic acid are dissolved in such an amount of very dilute caustic soda solution that the solution obtained has a very weak alkaline reaction. An aqueous solution of 13.8 parts of sodium nitrite is added and hydrochloric acid is then allowed to flow into the solution while cooling. The tetrazo solution thus obtained is poured into a solution, rendered alkaline with sodium carbonate, of 31.9 parts of 1-hydroxy-8-aminonaphthalene-3,6-disulfonic acid. When the 1-hydroxy-8-aminonaphthalene-3,6-disulfonic acid has been used up, 24.7 parts of 2',4'-dinitro-3-hydroxydiphenylamine dissolved in dilute caustic soda solution are introduced, the whole then being stirred for several hours. When coupling is completed, the product is salted out and filtered off by suction. A dyestuff is thus obtained which dyes chrome tanned velour leather blue-black shades of good fastness to polishing.

If 5'-hydroxy-2',4'-dinitro-3-hydroxydiphenylamine or 2',4',6'-trinitro-3-hydroxydiphenylamine be employed instead of 2',4'-dinitro-3-hydroxydiphenylamine dyestuffs having similar properties are obtained.

What we claim is:

1. A process for the production of azo dyestuffs which consists in coupling a tetrazotized 4,4'-diaminodiphenylamine with one molecular proportion of a 1-hydroxy-8-aminonaphthalene sulfonic acid capable of being coupled and one molecular proportion of a hydroxy benzene capable of being coupled at least once.

2. A process for the production of azo dyestuffs which consists in coupling a tetrazotized 4,4'-diaminodiphenylamine with one molecular proportion of a 1-hydroxy-8-aminonaphthalene disulfonic acid capable of being coupled and one molecular proportion of a hydroxy benzene capable of being coupled at least once.

3. A process for the production of azo dyestuffs which consists in coupling a tetrazotized 4,4'-diaminodiphenylamine with one molecular proportion of 1-hydroxy-8-aminonaphthalene-3,6-disulfonic acid capable of being coupled and one molecular proportion of a hydroxy benzene capable of being coupled at least once.

4. A process for the production of azo dyestuffs which consists in coupling a tetrazotized 4,4'-diaminodiphenylamine with one molecular proportion of 1-hydroxy-8-aminonaphthalene 3,6-disulfonic acid capable of being coupled and one molecular proportion of a hydroxymethylbenzene capable of being coupled at least once.

5. A process for the production of azo dyestuffs which consists in coupling a tetrazotized 4,4'-diaminodiphenylamine with one molecular proportion of 1-hydroxy-8-aminonaphthalene-3,6-disulfonic acid capable of being coupled and one molecular proportion of 1-hydroxy-4-methylbenzene.

6. A process for the production of azo dyestuffs which consists in coupling a tetrazotized 4,4'-diaminodiphenylamine with one molecular proportion of 1-hydroxy-8-aminonaphthalene-3,6-disulfonic acid capable of being coupled and one molecular proportion of 1,3-dihydroxybenzene.

7. A process for the production of azo dyestuffs which consists in coupling a tetrazotized 4,4'-diaminodiphenylamine with one molecular proportion of 1-hydroxy-8-aminonaphthalene-3,6-disulfonic acid capable of being coupled and one molecular proportion of a meta-hydroxydiphenylamine capable of being coupled at least once.

8. A process for the production of azo dyestuffs which consists in coupling a tetrazotized 4,4'-diaminodiphenylamine with one molecular proportion of 1-hydroxy-8-aminonaphthalene-3,6-disulfonic acid capable of being coupled and one molecular proportion of meta-hydroxydiphenylamine.

9. Azo dyestuffs corresponding to the general formula

wherein R stands for the radicle of a 1-hydroxy-8-aminonaphthalene sulfonic acid capable of being coupled, R₁ for a radicle of the group consisting of diphenylamine and its sulfonic acids the benzene nuclei of which are combined with the nitrogen atom in the para-positions to the azo groups and R₂ for the radicle of a hydroxy benzene capable of being coupled at least once.

10. Azo dyestuffs of the general formula

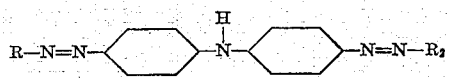

wherein R stands for the radicle of a 1-hydroxy-8-aminonaphthalene disulfonic acid capable of being coupled and R₂ for the radicle of a hydroxy benzene capable of being coupled at least once.

11. Azo dyestuffs of the general formula

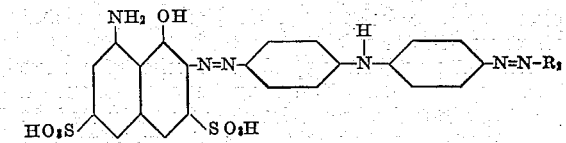

wherein R₂ stands for the radicle of a hydroxy benzene capable of being coupled at least once.

12. Azo dyestuffs of the general formula

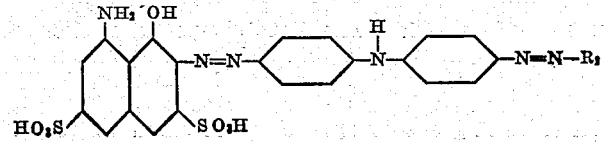

wherein $R_2$ stands for the radicle of a hydroxymethylbenzene.
13. The azo dyestuff of the formula
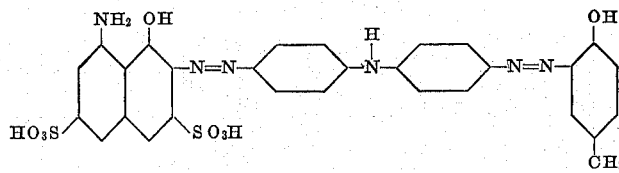
14. Azo dyestuffs of the general formula
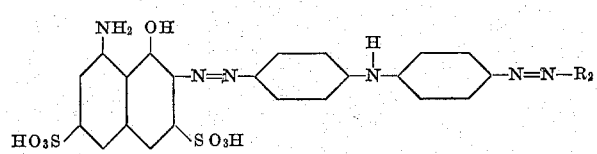
wherein $R_2$ stands for the radicle of a meta-hydroxydiphenylamine.
15. The azo dyestuff of the formula
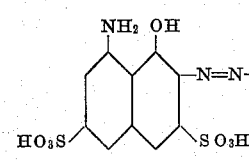
16. The azo dyestuff of the formula
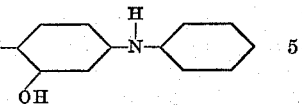
HANS KRZIKALLA.
LUDWIG NEUMANN.